UNITED STATES PATENT OFFICE.

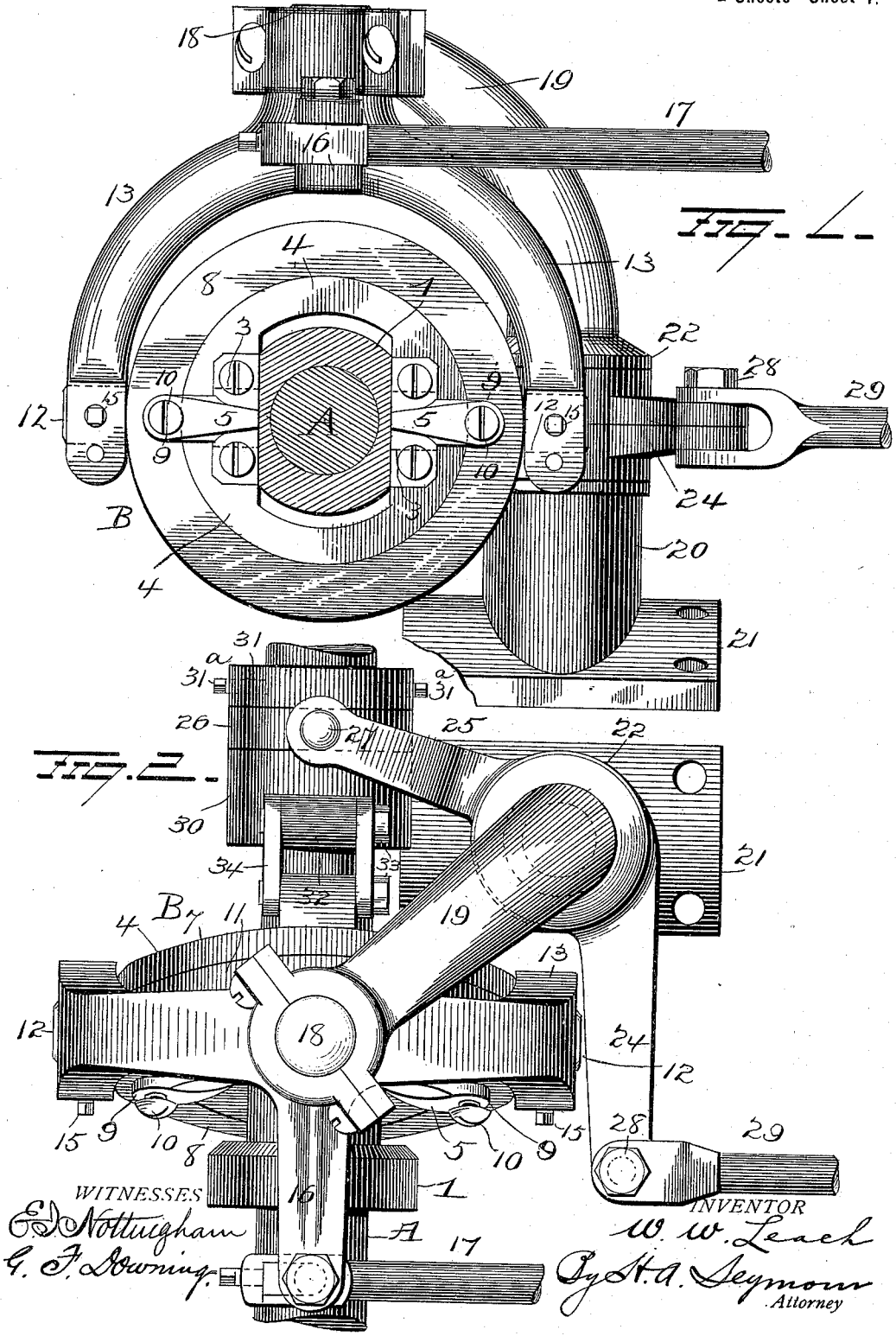

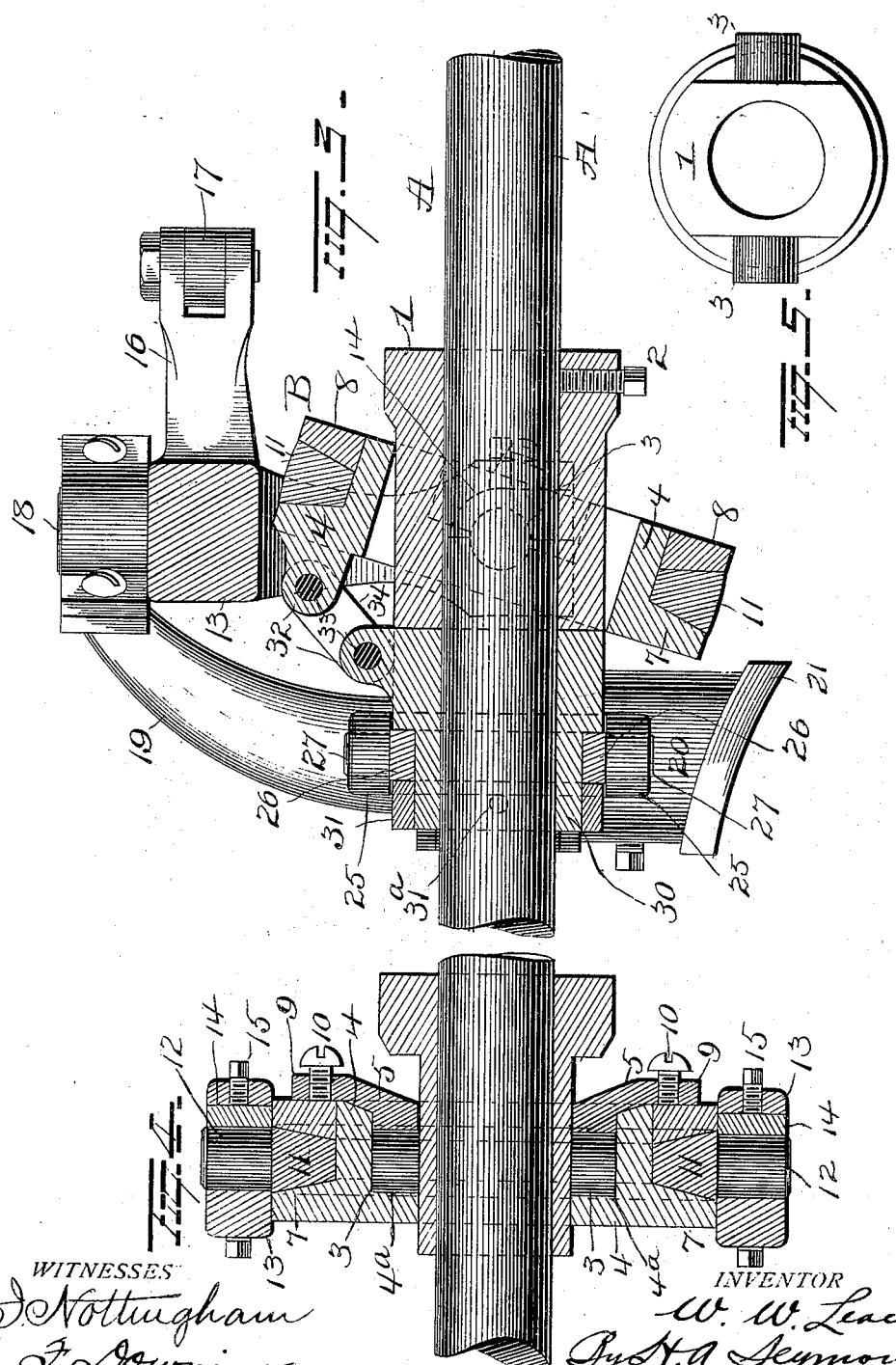

WILLIAM W. LEACH, OF JEWELL, OHIO.

MECHANISM FOR REVERSING ENGINES.

SPECIFICATION forming part of Letters Patent No. 641,023, dated January 9, 1900.

Application filed August 8, 1899. Serial No. 726,538. (No model.)

*To all whom it may concern:*

Be it known that I, WILLIAM W. LEACH, a resident of Jewell, in the county of Defiance and State of Ohio, have invented certain new and useful Improvements in Mechanism for Reversing Engines; and I do hereby declare the following to be a full, clear, and exact description of the invention, such as will enable others skilled in the art to which it appertains to make and use the same.

My invention relates to an improvement in reversing mechanism for engines, the object of the invention being to provide mechanism connected with the crank-shaft of an engine for operating the engine-valve and which can be readily operated to reverse the engine.

With this object in view the invention consists in a valve, a crank-shaft, an eccentric thereon, a yoke on said eccentric, a rod connecting said yoke and engine-valve, and means for shifting said eccentric on the crank-shaft to reverse the engine.

My invention further consists in certain novel features of construction and combinations and arrangements of parts, as will be more fully hereinafter described, and pointed out in the claims.

In the accompanying drawings, Figure 1 is view illustrating my improvements. Fig. 2 is a plan view. Fig. 3 is a view in longitudinal section, and Figs. 4 and 5 are detached views.

A represents a crank-shaft, and B my improved valve-operating mechanism connected therewith. A sleeve 1 is disposed on the shaft A and connected thereto by means of a set-screw 2. The sleeve 1 is made with oppositely-disposed flat faces, from which trunnions 3 project. A disk 4, having an elongated opening for the reception of the sleeve 1, is disposed on the latter and provided in its parallel inner walls with seats 4ª for the trunnions 3 on the sleeve, said trunnions being retained in place by means of blocks 5, secured to the disk 4 by means of screws 5ª and coöperating with the seats 4ª to form bearings for the trunnions 3. The disk 4 is made on one side with a peripheral flange 7, beveled on its inner face, and a ring 8, beveled on its inner face, is secured on the other side peripheral edge by means of tongues 9 on the blocks 5, which latter are provided with set-screws 10 for holding the ring 8 in place. A beveled ring 11 is revolubly mounted on the disk 4 between the flange 7 and ring 8 and is provided at diametrically opposite points with trunnions 12, mounted in a yoke 13, held in place on said trunnions by bearing-blocks 14, secured in said yoke by means of screws 15. The yoke 13 is made with an outwardly-projecting arm 16, to which is pivotally connected a rod 17 for operating the engine-valve, as will be more fully hereinafter explained. The yoke 13 is provided on its upper portion with a trunnion 18, journaled in the upper end of a curved standard or bracket 19, which is supported in a boss 20 on a plate 21, adapted to be secured to the boiler of an engine. The standard or bracket 19 is provided above the upper end of the boss with a flange 22, and said bracket is made circular below said flange and serves as a bearing for a lever 24. The lever 24 is provided at one end with a vertically-disposed yoke 25, having bearings in its respective members for the reception of oppositely-disposed trunnions 27 on a ring 26. The lever 24 is preferably made in two parts to permit the yoke 25 to receive the trunnions 27, and the long arm of the lever is disposed at a different angle from the short arm having the yoke 25 thereon, and the split sections are provided with alined holes for the reception of a pin or bolt 28, passing through the bifurcated end of a rod 29 for operating the lever to reverse the engine, as will be hereinafter explained.

The ring 26, with which the lever is connected, is mounted on the contracted portion of a sleeve 30, movably mounted on the crank-shaft A, and said ring 26 is held in place on the sleeve by a ring 31, having a set-screw 31ª therein for securing the same to the sleeve 30. The sleeve 30 and disk 4 are provided on one side with lugs 32 for the reception of pins 33, on which links 34 are mounted, so that when the sleeve 30 is moved it will operate to change the angle of the disk 4 on the sleeve 1, as will now be explained.

The operation of my improved device is as follows: The disk 4 is disposed at an angle on the sleeve 1, so that when the crank-shaft A is rotated motion will be transmitted through the sleeve 1 and disk 4 (the latter constituting an eccentric) and impart to the yoke 13 an oscillatory motion and to the valve-rod 17 a reciprocating motion to operate the engine-valve. When it is desired to reverse the engine, the rod 29 is pulled to move the lever 24 and shift the sleeve 30 on the shaft A, thus reversing the angle of the disk or eccentric 4 through the medium of the links 34, connecting the sleeve 30 and disk or eccentric 4, and hence reverse the movement of the yoke 13 and rod 17, which will result in reversing the engine.

Various slight changes might be resorted to in the general form and arrangement of the several parts described without departing from the spirit and scope of my invention; and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a reversing mechanism for engines, the combination with a sleeve adapted to be secured to the crank-shaft of the engine, said sleeve having trunnions, of an eccentric on said sleeve having internal half-bearings for said trunnions, a peripheral flange at one edge of said ring, a ring parallel with said flange, a ring loosely mounted between said flange and parallel ring, blocks secured in the eccentrics and constituting half-bearings for said trunnions, arms on said blocks projecting over the outer face of said parallel ring, a pivoted yoke connected to said loose ring at diametrically opposite points, a valve-rod attached to said yoke and means for turning the eccentric on its pivotal support.

2. In a reversing mechanism for engines, the combination with a sleeve to be secured to the crank-shaft of the engine, an eccentric pivoted to said sleeve and a ring on the eccentric, of a fixed bracket, a yoke pivotally mounted in said bracket and attached at its ends to the ring on the eccentric, an arm projecting from the yoke for the attachment of a valve-rod, a lever mounted between its ends on the fixed bracket, said lever comprising two parallel members, each provided at one end with a curved arm, a sleeve to slide on the crank-shaft, a connection between the sliding sleeve and the eccentric, and connections between the curved arms on the parallel members of the lever and the sliding sleeve.

In testimony whereof I have signed this specification in the presence of two subscribing witnesses.

WILLIAM W. LEACH.

Witnesses:
W. D. HILL,
H. G. BAKER.